United States Patent
Han et al.

(10) Patent No.: US 10,477,579 B2
(45) Date of Patent: Nov. 12, 2019

(54) COMMUNICATION DEVICE WORKING ON UNLICENSED FREQUENCY BAND AND METHOD PERFORMED BY THE SAME

(71) Applicant: Alcatel Lucent, Nozay (FR)

(72) Inventors: Feng Han, Shanghai (CN); Jianguo Liu, Shanghai (CN); Tao Tao, Shanghai (CN); Yan Meng, Shanghai (CN); Junrong Gu, Shanghai (CN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/762,615

(22) PCT Filed: Sep. 8, 2016

(86) PCT No.: PCT/IB2016/001392
§ 371 (c)(1),
(2) Date: Mar. 23, 2018

(87) PCT Pub. No.: WO2017/051246
PCT Pub. Date: Mar. 30, 2017

(65) Prior Publication Data
US 2018/0279367 A1   Sep. 27, 2018

(30) Foreign Application Priority Data

Sep. 25, 2015   (CN) .......................... 2015 1 0623116

(51) Int. Cl.
*H04W 74/08*   (2009.01)
*H04W 24/08*   (2009.01)
(Continued)

(52) U.S. Cl.
CPC ....... *H04W 74/0808* (2013.01); *H04W 24/08* (2013.01); *H04W 16/14* (2013.01);
(Continued)

(58) Field of Classification Search
CPC ... H04W 16/14; H04W 24/08; H04W 72/087; H04W 72/1242; H04W 74/006; H04W 74/0808
(Continued)

(56) References Cited

U.S. PATENT DOCUMENTS

2016/0143014 A1*   5/2016   Mukherjee ........ H04W 74/0816
                                                              370/330
2018/0124828 A1*   5/2018   Kim ..................... H04W 74/00
(Continued)

FOREIGN PATENT DOCUMENTS

CN   101047476 A   10/2007
CN   101686551 A    3/2010
(Continued)

OTHER PUBLICATIONS

Huawei et al., "QoS Handling in DL LBT Operation," 3$^{rd}$ Generation Partnership Project (3GPP), 3GPP TSG RAN WG1 82 Meeting, R1-154609, 5 pages, XP051001863, Beijing, China, Aug. 24-28, 2015.

(Continued)

*Primary Examiner* — Robert J Lopata
(74) *Attorney, Agent, or Firm* — Fay Sharpe LLP

(57) ABSTRACT

Embodiments of the present disclosure relates to a communication device working on unlicensed frequency band and a method for executing the same. The method comprises: determining a mapping relationship between multiple quality of service (QoS) priority classes and multiple Listen-Before-Talk (LBT) priority classes, wherein the multiple QoS priority classes are in one-to-one correspondence with multiple QoS requirements; and transmitting radio traffic based on the mapping relationship. Embodiments of the present disclosure proposes the mapping relationship between LBT priority class and various QoS priority classes associated with different radio traffic types and presents signaling design and exchange related to the mapping relationship.

12 Claims, 6 Drawing Sheets

(51) Int. Cl.
 *H04W 16/14* (2009.01)
 *H04W 74/00* (2009.01)
 *H04W 72/08* (2009.01)
 *H04W 72/12* (2009.01)

(52) U.S. Cl.
 CPC ...... *H04W 72/087* (2013.01); *H04W 72/1242* (2013.01); *H04W 74/006* (2013.01)

(58) Field of Classification Search
 USPC .......................................................... 370/329
 See application file for complete search history.

(56) References Cited

U.S. PATENT DOCUMENTS

| | | | |
|---|---|---|---|
| 2018/0139779 A1* | 5/2018 | Kim | H04L 1/00 |
| 2018/0317246 A1* | 11/2018 | Mukherjee | H04W 74/0816 |
| 2019/0014596 A1* | 1/2019 | Yang | H04W 72/0446 |

FOREIGN PATENT DOCUMENTS

| | | |
|---|---|---|
| CN | 104717687 A | 6/2015 |
| WO | WO 2015/042389 A1 | 3/2015 |

OTHER PUBLICATIONS

Ericsson, "Further Details on LBT Design in DL for LAA," $3^{rd}$ Generation Partnership Project (3GPP), 3GPP TSG RAN WG1 Ad-hoc Meeting, R1-151131, 7 pages, XP050951456, Paris, France, Mar. 24-26, 2015.

Ericsson, "Discussion on framework and parameter setting for Category 4 LBT for LAA," $3^{rd}$ Generation Partnership Project (3GPP), 3GPP TSG RAN WG1 #82, R1-154620, 6 pages, XP050993683, Beijing, China, Aug. 24-28, 2015.

International Search Report for PCT/IB2016/001392 dated Dec. 2, 2016.

* cited by examiner

| AC | CWmin | CWmax | AIFSN | TXOP limit |
|---|---|---|---|---|
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |
| Legacy | 15 | 1023 | 2 | 0 |

| LBT priority class | CWmin | CWmax | n (AIFSN) |
|---|---|---|---|
| 1 | 3 | 7 | 1 |
| 2 | 7 | 15 | 1 |
| 3 | 15 | 63 | 3 |
| 4 | 15 | 1023 | 7 |

Fig.3

| QCI | Resource Type | Priority | Packet Delay Budget (NOTE 1) | Packet Error Loss Rate (NOTE 2) | Example Services |
|---|---|---|---|---|---|
| 1 | GBR | 2 | 100 ms | $10^{-2}$ | Conversational Voice |
| 2 | | 4 | 150 ms | $10^{-3}$ | Conversational Video (Live Streaming) |
| 3 | | 3 | 50 ms | $10^{-3}$ | Real Time Gaming |
| 4 | | 5 | 300 ms | $10^{-6}$ | Non-Conversational Video (Buffered Streaming) |
| 5 | Non-GBR | 1 | 100 ms | $10^{-6}$ | IMS Signalling |
| 6 | | 6 | 300 ms | $10^{-6}$ | Video (Buffered Streaming) TCP-based (e.g., www, e-mail, chat, ftp, p2p file sharing, progressive video, etc.) |
| 7 | | 7 | 100 ms | $10^{-3}$ | Voice, Video (Live Streaming) Interactive Gaming |
| 8 | | 8 | 300 ms | $10^{-6}$ | Video (Buffered Streaming) TCP-based (e.g., www, e-mail, chat, ftp, p2p file sharing, progressive video, etc.) |
| 9 | | 9 | | | |

Fig.4

| DRB identity | LBT priority class |
|---|---|
| 1 | 1 |
| 2 | 2 |
| 3 | 2 |
| 4 | 2 |
| 5 | 3 |
| 6 | 3 |
| 7 | 4 |
| 8 | 4 |

Fig. 9

COMMUNICATION DEVICE WORKING ON UNLICENSED FREQUENCY BAND AND METHOD PERFORMED BY THE SAME

FIELD

The present invention relates generally to the field of wireless communications, and more particularly to a communication device working on an unlicensed frequency band and a method performed by the same.

BACKGROUND

Operators are using unlicensed frequency bands to augment their services supplies, which is being studied in 3GPP and called Licensed-Assisted-Access (LAA). When LTE works in unlicensed frequency bands, the key issue is to ensure fair coexistence with Wi-Fi system and other systems.

Currently, Wi-Fi system designs Enhanced Distributed Channel Access (EDCA) to support prioritized quality of service (QoS), wherein four access categories (ACs) are defined. Each AC is characterized by specific values for a set of access parameters (e.g., defer period, contention window size, transmit opportunity) that statistically prioritize channel access for one AC over another.

Naturally, LAA systems coexisted with Wi-Fi system should also support QoS with multiple Listen-Before-Talk (LBT) priority classes. Downlink LBT procedure for LTE-LAA has been discussed in 3GPP and it recommends a LBT mechanism operating similar to channel access in Wi-Fi for LAA downlink transmission.

Until now, LAA lacks solutions in which multiple QoS requirements are processed using LBT operation. Therefore, it becomes particularly important to design a mapping relationship between multiple QoS priority classes and multiple Listen-Before-Talk (LBT) priority classes and potential signaling to support different QoS in LTE-LAA.

SUMMARY

In light of the above existing problems in the prior art, embodiments of the present disclosure aim at providing a communication device working on an unlicensed frequency band and a method performed by the same, to solve the above and other issues in the prior art. The embodiments of the present disclosure provide the mapping relationship between different QoS priority classes associated with various radio traffic types and LBT priority classes and propose signaling design and signaling exchange related to the mapping relationship.

In one aspect of the present disclosure, it provides a method performed by a communication device working on an unlicensed frequency band. The method can include: determining a mapping relationship between multiple QoS priority classes and multiple Listen-Before-Talk (LBT) priority classes, wherein the multiple QoS priority classes are in one-to-one correspondence with multiple QoS requirements; and transmitting radio traffic based on the mapping relationship.

In some embodiments, the mapping relationship can comprise: mapping each QoS priority class only to one LBT priority class.

In some embodiments, the mapping relationship can comprise: mapping each QoS priority class to a plurality of LBT priority classes. In these embodiments, transmitting radio traffic based on the mapping relationship can comprise: selecting one of a plurality of LBT priority classes to which the QoS priority class is mapped to transmit radio traffic.

In some embodiments, the mapping relationship can comprise: causing a LBT priority class to which a higher QoS priority class is mapped to be not lower than a LBT priority class mapped to by a lower QoS priority class.

In some embodiments, the mapping relationship can be predefined.

In some embodiments, the mapping relationship can be configurable. In these embodiments, there may be a default mapping relationship. In these embodiments, the mapping relationship can be semi-statically configurable.

In some embodiments, the mapping relationship can be cell-specific.

In some embodiments, the mapping relationship can be user equipment-specific.

In some embodiments, if each QoS priority class is only mapped to one LBT priority class, transmitting radio traffic based on the mapping relationship can comprise: when the radio traffic is associated with at least two LBT priority classes of the multiple LBT priority classes, transmit radio traffic using a lower LBT priority class of the at least two LBT priority classes.

In some embodiments, if the communication device is a base station, determining a mapping relationship between multiple QoS priority classes and multiple Listen-Before-Talk (LBT) priority classes can comprise: configuring a mapping relationship between multiple QoS priority classes and multiple Listen-Before-Talk (LBT) priority classes. In these embodiments, the method can further comprise: transmitting the mapping relationship to user equipment. In these embodiments, transmitting the mapping relationship to user equipment can comprise: transmitting the mapping relationship to the user equipment via a broadcast message. In these embodiments, transmitting the mapping relationship to user equipment can comprise: transmitting the mapping relationship to particular user equipment via a user equipment-specific message. In these embodiments, the method can further comprise: receiving, from a neighboring base station, a mapping relationship used by the neighboring base station; and configuring the mapping relationship based on mapping relationship used by the neighboring base station.

In some embodiments, if the communication device is user equipment, determining a mapping relationship between multiple QoS priority classes and multiple Listen-Before-Talk (LBT) priority classes can comprise: receiving the mapping relationship from a base station. In these embodiments, receiving the mapping relationship from a base station can comprise: receiving the mapping relationship from a base station via a broadcast message. In these embodiments, receiving the mapping relationship from a base station can comprise: receiving the mapping relationship from a base station through a user equipment-specific message.

In some embodiments, the QoS priority class can comprise Quality Class Identifier QCI.

In some embodiments, the QoS priority class can comprise Data Radio Bearer DRB and/or Signaling Radio Bearer SRB.

In some embodiments, the QoS priority class can comprise a physical layer signaling.

In a second aspect of the present disclosure, it provides a communication device working on an unlicensed frequency band. The communication device can comprise: a determining unit configured to determine a mapping relationship between multiple QoS priority classes and multiple Listen- Before-Talk (LBT) priority classes, wherein the multiple QoS priority classes are in one-to-one correspondence with multiple QoS requirements; and a transmitting unit configured to transmit radio traffic based on the mapping relationship.

In some embodiments, the mapping relationship can comprise: mapping each QoS priority class only to one LBT priority class.

In some embodiments, the mapping relationship can comprise: mapping each QoS priority class to a plurality of LBT priority classes. In these embodiments, the transmitting unit can be further configured to: select one of a plurality of LBT priority classes to which QoS priority class is mapped to transmit radio traffic.

In some embodiments, the mapping relationship can comprise: causing a LBT priority class to which a higher QoS priority class is mapped to be not lower than a LBT priority class to which a lower QoS priority class is mapped.

In some embodiments, the mapping relationship can be predefined.

In some embodiments, the mapping relationship can be configurable. In these embodiments, there may be a default mapping relationship. In these embodiments, the mapping relationship can be semi-statically configurable.

In some embodiments, the mapping relationship can be cell-specific.

In some embodiments, the mapping relationship can be user equipment-specific.

In some embodiments, if each QoS priority class is only mapped to one LBT priority class, the transmitting unit can be further configured: when the radio traffic is associated with at least two LBT priority classes of the multiple LBT priority classes, transmit radio traffic using a lower LBT priority class of the at least two LBT priority classes.

In some embodiments, the communication device can be a base station, and the determining unit can be further configured to: configure a mapping relationship between multiple QoS priority classes and multiple Listen-Before-Talk (LBT) priority classes. In these embodiments, the transmitting unit can be further configured to: transmit the mapping relationship to user equipment. In these embodiments, the transmitting unit can be further configured to: transmit the mapping relationship to the user equipment via a broadcast message. In these embodiments, the transmitting unit can be further configured to: transmit the mapping relationship to particular user equipment via a user equipment-specific message. In these embodiments, the communication device can further comprise: a receiving unit configured to receive, from a neighboring base station, a mapping relationship used by the neighboring base station; and the determining unit is further configured to configure the mapping relationship based on mapping relationship used by the neighboring base station.

In some embodiments, the communication device can be user equipment, the determining unit can be further configured to: receive the mapping relationship from a base station. In these embodiments, the determining unit can be further configured to: receive the mapping relationship from a base station via a broadcast message. In these embodiments, the determining unit can be further configured to: receive the mapping relationship from a base station through a user equipment-specific message.

In some embodiments, the QoS priority class can comprise Quality Class Identifier QCI.

In some embodiments, the QoS priority class can comprise Data Radio Bearer DRB and/or Signaling Radio Bearer SRB.

In some embodiments, the QoS priority class can comprise a physical layer signaling.

BRIEF DESCRIPTION OF THE DRAWINGS

With reference to the drawings and the detailed description below, it is easy to understand the above and other objectives, features and advantages of the embodiments of the present disclosure. In the drawings, multiple embodiments of the present disclosure are shown in an illustrative yet non-restrictive manner, wherein:

FIG. 3 illustratively shows an example of LBT priority class for LAA system.

FIG. 4 illustratively shows standardized QCI characteristics.

FIG. 9 illustratively shows a specific example of the mapping relationship between DRB and LBT priority class.

DETAILED DESCRIPTION

Figures 1, 2:
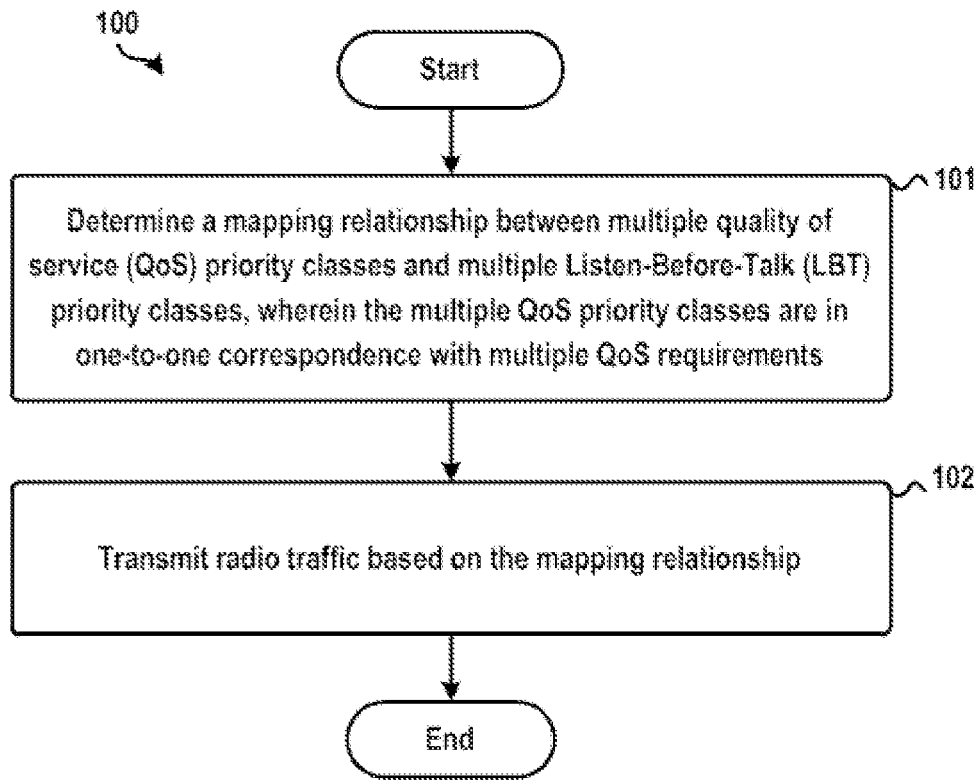
FIG. 1 illustratively shows a method performed by a communication device working on an unlicensed frequency band according to the embodiments of the present disclosure.
FIG. 2 illustratively shows default EDCA access parameters for 802.11a, 802.11g and 802.11n physical layers of Wi-Fi system.

The principle and spirit of the present disclosure will be described with reference to the multiple exemplary embodiments shown in the drawings. It is to be appreciated that describing these specific embodiments only aims to provide a better understanding for those skilled in the art and implement the present disclosure, rather than restrict the scope of the present disclosure in any manners.

FIG. 1 illustratively shows a method 100 performed by a communication device working on an unlicensed frequency band according to the embodiments of the present disclosure.

As shown in FIG. 1, the method 100 proceeds to step 101 after the start. In step 101, the communication device working on an unlicensed frequency band can determine a mapping relationship between multiple QoS priority classes and multiple Listen-Before-Talk (LBT) priority classes, wherein the multiple QoS priority classes are in one-to-one correspondence with multiple QoS requirements. Those skilled in the art can understand that in step 101, QoS priority class can be any parameters that embody priority classes for QoS and meet the condition that the multiple QoS priority classes are in one-to-one correspondence with multiple QoS requirements. In this regard, QoS priority class may comprise, for example, Quality Class Indicator QCI, or Data Radio Bearer DBR and/or Signaling Radio Bearer SRB, or physical layer signaling for the purpose of illustration. When the QoS priority class comprises QCI, its corresponding multiple QoS requirements can comprise resource types, priority classes, packet delay budget and packet error loss rate etc.

As an example, the communication device in step 101 can be a communication device in LAA system. As described above, LAA systems coexisted with Wi-Fi system should also support QoS with multiple Listen-Before-Talk (LBT) priority classes. In this regard, FIG. 2 illustratively shows default EDCA access parameters for 802.11a, 802.11g and 802.11n physical layers of Wi-Fi system. Furthermore, in FIG. 2, the arbitration inter-frame space (AIFS) for a particular access category is defined by the following equation: AIFS [AC]=SIFSTime+AIFSN[AC]*SlotTime.

In another aspect, downlink LBT procedure for LTE-LAA has been discussed in 3GPP and it recommends a LBT mechanism operating similar to channel access in Wi-Fi for LAA downlink transmission. In this regard, FIG. 3 illustratively shows an example of LBT priority class for LAA system, wherein it depicts the minimum contention window size, the maximum contention window size and AIFS for characterizing LBT priority class.

It is seen from FIGS. 2 and 3 that LBT priority class and EDCA access parameter of Wi-Fi system are extremely similar. Therefore, in order to apply LBT priority class into LTE, it requires mapping multiple QoS priority classes to multiple Listen-Before-Talk (LBT) priority classes, such that the communication device working on an unlicensed frequency band can transmit radio traffic in the unlicensed frequency band based on LBT priority class.

Next, method 100 proceeds to step 102. In step 102, the communication device working on an unlicensed frequency band can transmit radio traffic based on the mapping relationship. Those skilled in the art can understand that the communication device working on an unlicensed frequency band needs to transmit radio traffic based on LBT priority class. Therefore, the communication device working on an unlicensed frequency band can further determine LBT priority class based on the determined mapping relationship in step 101 through QoS priority class of radio traffic to be transmitted.

According to some embodiments of the present disclosure, the mapping relationship can comprise: mapping each QoS priority class only to one LBT priority class. In these embodiments, the communication device working on an unlicensed frequency band can solely determine the LBT priority class used for transmitting radio traffic on the unlicensed frequency band from QoS priority class of radio traffic to be transmitted based on the mapping relationship and then perform transmission according to parameters of the LBT priority class.

According to some embodiments of the present disclosure, the mapping relationship can comprise: mapping each QoS priority class to a plurality of LBT priority classes, i.e., a range of LBT priority class is defined for each QoS priority class. In these embodiments, the base station, based on its own information, decides and uses one LBT priority class for data type corresponding to QoS priority class. Therefore, in these embodiments, step 102 can further comprise: selecting one of a plurality of LBT priority classes to which QoS priority class is mapped to transmit radio traffic. Those skilled in the art can understand that the communication device can, based on parameters such as channel condition and cell loading, select a suitable one from the multiple LBT priority classes to transmit radio traffic because QoS priority class can be mapped to multiple LBT priority classes.

According to some embodiments of the present disclosure, the mapping relationship can comprise: causing a LBT priority class to which a higher QoS priority class is mapped to be not lower than a LBT priority class to which a lower QoS priority class is mapped. Those skilled in the art can understand that the QoS priority class per se represents priority of the traffic to be transmitted. Therefore, it should preferably map a higher QoS priority class to a higher LBT priority class, so as to transmit radio traffic with higher QoS priority class using a higher LBT priority class. That is, it should preferably cause a LBT priority class to which a higher QoS priority class is mapped to be not lower than a LBT priority class to which a lower QoS priority class is mapped.

According to some embodiments of the present disclosure, the mapping relationship can be predefined. In these embodiments, any communication devices are aware of the predefined mapping relationship and transmit radio traffic according to the predefined mapping relationship. In the specific example of LTE-LAA, it means that there is completely no need to design signaling for mapping relationship interaction regarding LTE-LAA uplink and downlink.

According to some embodiments of the present disclosure, the mapping relationship is configurable. In these embodiments, the mapping relationship is not predefined, but is configured by the communication device working on an unlicensed frequency band based on its channel condition and cell loading etc. Besides, the mapping relationship can be configured or adjusted as the parameters vary along time.

In these embodiments, the mapping relationship is configurable, wherein there may be a default mapping relationship. That is, those skilled in the art can understand that the default mapping relationship is always used by the communication device working on an unlicensed frequency band if no updated relationship is configured. In addition, the mapping relationship can be semi-statically configurable, i.e., the communication device working on an unlicensed frequency band can configure or adjust the mapping relationship over a longer time span.

For example, if the communication device is a base station, the base station, based on its cell loading, channel condition and other information, can change the mapping relationship. For the downlink LAA, when downlink cell load becomes pretty high and the base station senses that the carrier is pretty free, a smaller contention window size and the mapping relationship corresponding to a smaller value of Clear Channel Assessment CCA slots in the defer period can be used to expedite the channel access. As a typical example, when the base station senses that the channel is pretty free for a time while a certain low priority class traffic is far larger than other traffic types, the LBT priority class corresponding to the low priority class traffic type can be adjusted, e.g., to use the little higher priority level to expedite the channel access.

According to some embodiments of the present disclosure, the mapping relationship can be cell-specific and user equipment-specific. In other words, one cell can correspond to one mapping relationship or one user equipment can correspond to one mapping relationship, such that a more refined priority class configuration can be realized in radio communication systems. If the mapping relationship is user equipment-specific, the base station can determine the mapping relationship based on the channel condition and cell loading etc. reported by the user equipment. For example, when the downlink cell load is low, the base station is configured such that the mapping relationship of a smaller contention window is broadcasted to all served user equipment. The process can also be equipment-specific, e.g., the user equipment at a little high congestion situation can be configured with a mapping relationship of a larger contention window.

According to some embodiments of the present disclosure, if each QoS priority class is only mapped to one LBT priority, step 102 can further comprise: when the radio traffic is associated with at least two LBT priority classes of the multiple LBT priority classes, transmit radio traffic using a lower LBT priority class of the at least two LBT priority classes. In these embodiments, the radio traffic which is needed to be transmitted by the communication device working on an unlicensed frequency bands involves with multiple LBT priority classes. For example, in a specific example of LTE-LAA, the radio traffic to be transmitted can comprise traffic of different priority requirements, such as audio and video and they respectively correspond to different LBT priority classes. Therefore, the radio traffic relates to multiple LBT priority classes. In such case, the radio traffic should be transmitted using the lowest LBT priority class, in order to fairly co-exist with other communication systems in the unlicensed frequency band.

According to some embodiments of the present disclosure, if the communication device is a base station, step 101 can comprise: configuring a mapping relationship between multiple QoS priority classes and multiple Listen-Before-Talk (LBT) priority classes. In these embodiments, the mapping relationship is not pre-defined thus it requires the base station itself to configure the mapping relationship. In these embodiments, method 100 can further comprise: transmitting the mapping relationship to user equipment. If the mapping relationship is not pre-defined, the user equipment cannot determine the mapping relationship on its own. Therefore, in such case, the base station needs to transmit the mapping relationship determined by itself to the user equipment, to facilitate the user equipment to transmit radio traffic based on the mapping relationship determined by the base station. Furthermore, in these embodiments, transmitting the mapping relationship to the user equipment can comprise: transmitting the mapping relationship to the user equipment via a broadcasted message, which means that all user equipment use the received mapping relationship at a time until the new or updated broadcast information is received. In one embodiment, the signaling can be included in System Information Broadcasting (SIB). Alternatively, transmitting the mapping relationship to user equipment can comprise: transmitting the mapping relationship to particular user equipment via a user equipment-specific message. In one embodiment, the message can be RRC signaling, MAC command or other suitable messages.

According to some embodiments of the present disclosure, if the communication is a base station and the mapping relationship is configurable, method 100 can further comprise: receiving, from a neighboring base station, a mapping relationship used by the neighboring base station; and configuring the mapping relationship based on mapping relationship used by the neighboring base station. In one embodiment, the selected mapping relationship can be signaled between neighboring base stations via X2/S1 interface for implementing self-organization and self-configuration of the network. The receiving base station can semi-statically change or configure the mapping relationship based on its own cell status as well as the LBT parameters of its neighboring base station. In one embodiment, cell-specific mapping relationships can be exchanged between base stations. For example, when a second base station receives mapping relationship information of a first base station, it can adjust its mapping relationship accordingly taking its own information into account. In one embodiment, when the user equipment is moved from one cell to another cell, the user equipment-specific mapping relationship can be transmitted from the source base station to target base station for further LBT priority configuration.

According to some embodiments of the present disclosure, if the communication device is user equipment, step 101 can comprise: receiving the mapping relationship from the base station. In these embodiments, the mapping relationship is not pre-defined and the user equipment cannot determine the mapping relationship accordingly. Therefore, in such case, the user equipment needs to receive from the base station the mapping relationship determined by it, to facilitate the user equipment to transmit radio traffic based on the mapping relationship determined by the base station. In this regard, according to some embodiments of the present disclosure, the mapping relationship received from the base station can comprise: receiving the mapping relationship from the base station via a broadcast message. Alternatively, receiving the mapping relationship from the base station can comprise: receiving the mapping relationship from the base station via a user equipment-specific message.

According to some embodiments of the present disclosure, the QoS priority class can comprise Quality Class Identifier QCI. Alternatively, the QoS priority class can comprise Data Radio Bearer DRB and/or Signaling Radio Bearer SRB. Alternatively, the QoS priority class can comprise a physical layer signaling, e.g., downlink control signaling.

After going through step 102, method 100 completes.

With reference to FIGS. 4-9, a mapping relationship between QoS priority class and LBT priority class is described in details with Quality Class Identifier QCI and Data Radio Bearer DRB as examples.

First, LTE regulates nine Quality Class Identifier QCI and eight Data Radio Bearers DRBs to support necessary QoS supplies, wherein each QCI is characterized by priority, packet delay and acceptable packet loss. FIG. 4 gives detailed standardized QCI characteristics. Assuming LAA supports smaller number of LBT priority classes (4 in FIG. 2) than the current nine QCIs, there is a need to map each QCI value to the defined LBT priority classes, i.e., a mapping relationship between QCI and LBT is required.

Second, for LTE-LAA uplink, the user equipment needs to be configured with the mapping relationship between the multiple uplink traffics and the LBT priority class. Based on this knowledge, the user equipment could select the corresponding LBT parameters corresponding to the traffic type when only this traffic type is transmitted, or select the LBT parameters corresponding to the lowest LBT priority in case the intended downlink transmission burst with PDSCH contains traffic corresponding to different LBT priority classes.

Also, under some circumstances, the mapping relationship is beneficial to be exchanged between neighboring intra-operator base stations for self-optimization purpose. The base station can semi-statically change or configure the mapping relationship based on its own cell status as well as the LBT parameters of its neighboring base station. Hence, it is desired to design the mapping relationship as well as potential signaling to support different QoS in LTD-LAA.

To support multiple traffic services and QoS in LAA, based on a specific embodiment of the present disclosure depicted in FIG. 3, it proposes the mapping table between the radio traffic service types and LBT priority class, wherein the mapping table could be set as default, or could be semi-statically changed and signaled. In FIG. 3, one category 4 LBT priority class is defined by the minimum and maximum contention window (CW) sizes and the number of CCA slots in the defer period (n in FIG. 3).

FIG. 4 illustratively shows standardized QCI characteristics. As shown in FIG. 4, QCI is classified into 1-9 priority levels in total and divided into two groups corresponding to two resource types of Guaranteed Bit Rate (GBR) and non-Guaranteed Bit Rate (non-GBR). In addition, FIG. 4 also depicts the priority, packet delay budge, packet error loss rate and sample service corresponding to each numbered QCI.

Figure 5:
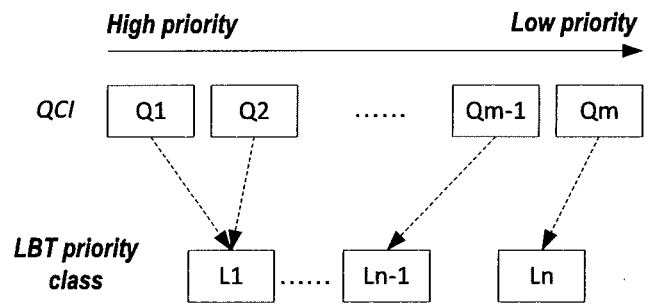
FIG. 5 illustratively shows a diagram of a mapping mode between QCI and LBT priority class.

FIG. 5 illustratively shows a diagram of a mapping mode between QCI and LBT priority class. As shown in FIG. 5, each QCI priority class is only mapped to one LBT priority class. Those skilled in the art can understand that multiple QCI priority classes will be definitely mapped to one same LBT priority class because the number of LBT priority classes is smaller than the number of QCI priority classes in the specific example. In addition, in the specific example depicted in FIG. 5, QCI with a higher priority class is correspondingly mapped to the LBT with a higher priority class.

Figure 6:
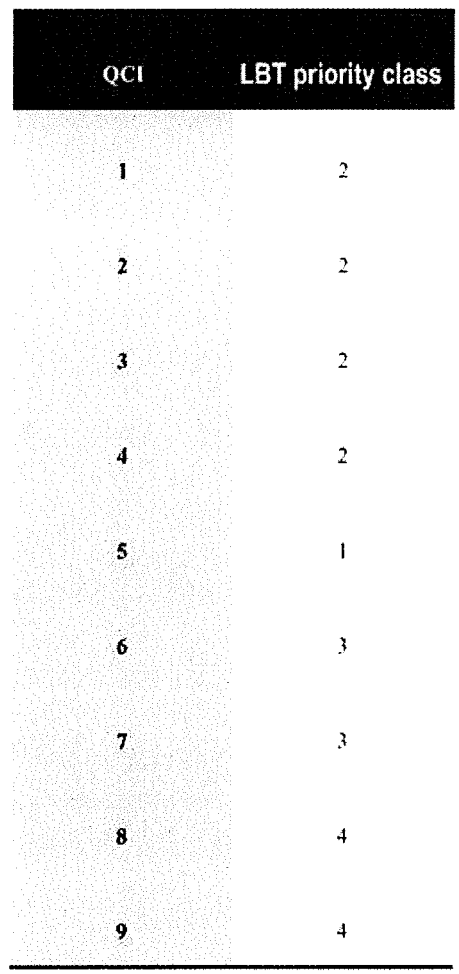
FIG. 6 illustratively shows a specific example of the mapping relationship between QCI and LBT priority class.

FIG. 6 illustratively shows a specific example of the mapping relationship between QCI and LBT priority class. In the specific example shown in FIG. 6, QCI 5 with the highest priority is mapped to the LBT priority class 1 with the highest priority. Then, the higher QCI priority classes 1-4 are mapped to LBT priority class 2, QCI priority classes 6-7 are mapped to LBT priority class 3 and the second lowest and the lowest QCI priority classes 8-9 are mapped to LBT priority class 4. Those skilled in the art can understand that the mapping relationship depicted in FIG. 6 is just a specific example of the mapping relationship between QCI and LBT priority class. The embodiments of the present disclosure are not limited to such specific mapping relationship.

Figure 7:
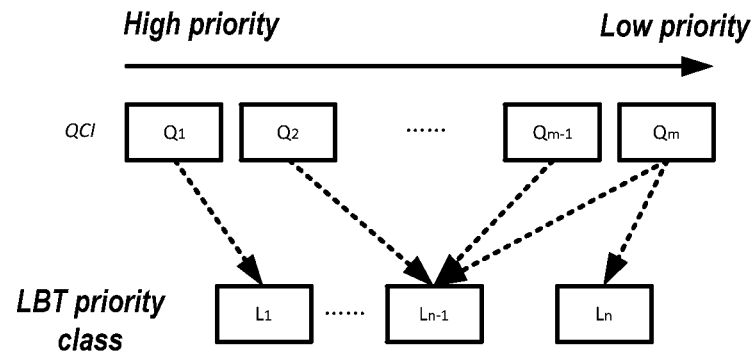
FIG. 7 illustratively shows a diagram of another mapping mode between QCI and LBT priority class.

FIG. 7 illustratively shows a diagram of another mapping mode between QCI and LBT priority class. In the mapping mode depicted in FIG. 7, one QCI priority class can be mapped to not only one LBT priority class, but also multiple LBT priority classes. For example, QCI priority class Qm is mapped to two LBT priority classes Ln-1 and Ln in FIG. 7. As stated above, in such case, the communication device working on an unlicensed frequency band can select one from LBT priority classes Ln-1 and Ln to transmit the radio traffic when needed. It should be noted that the numbers listed here are only for illustration purpose, and other numbers are also included within the scope of the present disclosure.

Figure 8:
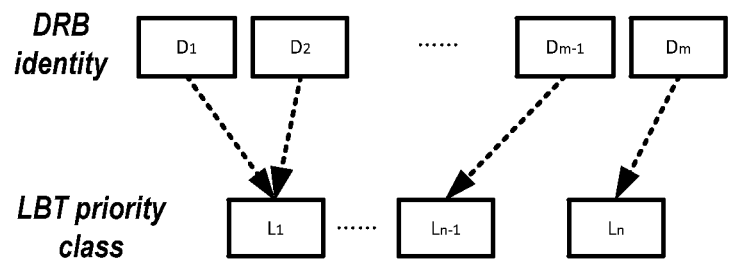
FIG. 8 illustratively shows a diagram of a mapping mode between DRB and LBT priority class.

With reference to FIGS. 8-9, the mapping relationship between QoS priority class and LBT priority class is described in details with Data Radio Bearer DRB as an example. Those skilled in the art can understand that Signaling Radio Bearer SRB and DRB can be mapped in the same manner. Therefore, the description will not go into details for SRB.

FIG. 8 illustratively shows a diagram of a mapping mode between DRB and LBT priority class. As shown in FIG. 8, each DRB identifier is only mapped to one LBT priority class. Those skilled in the art can understand that multiple DRB identifiers will be definitely mapped to one same LBT priority class because the number of LBT priority classes is smaller than the number of DRB identifiers in the specific example. In addition, similar to the above description with QCI, each DBR identifier can also be mapped to multiple LBT priority classes. In such case, the operation manner of the communication device working on an unlicensed frequency band is also similar and will not be repeated here. It should be noted that the numbers listed here are only for illustration purpose, and other numbers are also included within the scope of the present disclosure.

FIG. 9 illustratively shows a specific example of the mapping relationship between DRB and LBT priority class. In the specific example shown in FIG. 9, DRB identifier 1 is mapped to the highest LBT priority class 1. Next, DRB identifiers 2-4 are mapped to LBT priority class 2, DRB identifiers 5-6 are mapped to LBT priority class 3 and DRB identifiers 7-8 are mapped to the lowest LBT priority class 4 in the end. Those skilled in the art are can understand that the mapping relationship depicted in FIG. 9 is just a specific example of the mapping relationship between DRB and LBT priority class. The embodiments of the present disclosure are not limited to such specific mapping relationship.

Figure 10:
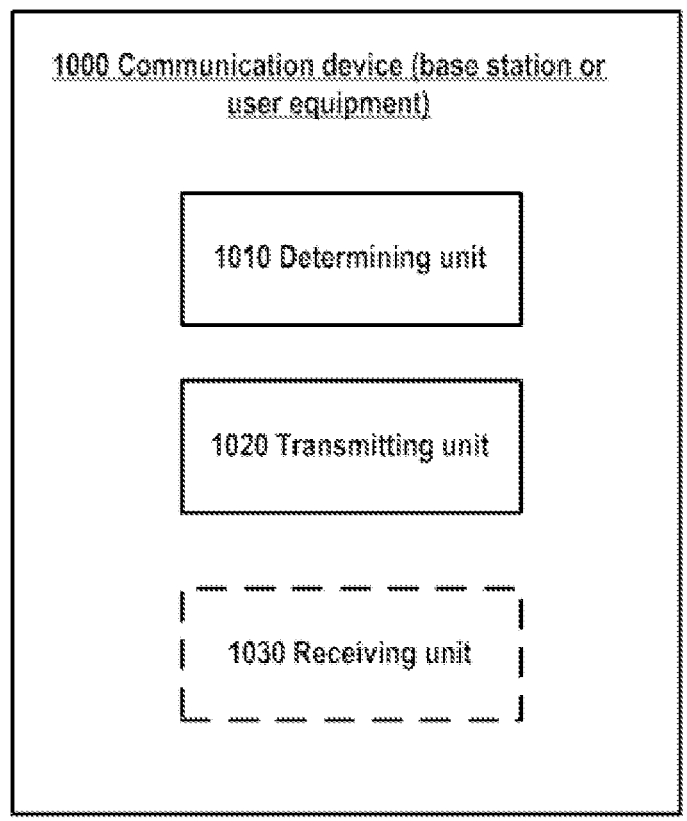
FIG. 10 illustratively shows a communication device working on an unlicensed frequency band according to the embodiments of the present disclosure.

FIG. 10 illustratively shows a communication device 1010 working on an unlicensed frequency band according to the embodiments of the present disclosure. In FIG. 10, dashed box indicates the unit is selectable. As shown in FIG. 10, the communication device 1010 can comprise a determining unit 101 and a transmitting unit 1020.

According to some embodiments of the present disclosure, a determining unit 1010 can be configured to determine a mapping relationship between multiple QoS priority classes and multiple Listen-Before-Talk (LBT) priority classes, wherein the multiple QoS priority classes are in one-to-one correspondence with multiple QoS requirements. The transmitting unit 1020 can be configured to transmit radio traffic based on the mapping relationship.

According to some embodiments of the present disclosure, the mapping relationship can comprise: mapping each QoS priority class only to one LBT priority class.

According to some embodiments of the present disclosure, the mapping relationship can comprise: mapping each QoS priority class to a plurality of LBT priority classes. In these embodiments, the transmitting unit 1020 can be further configured to: select one of a plurality of LBT priority classes to which QoS priority class is mapped to transmit radio traffic.

According to some embodiments of the present disclosure, the mapping relationship can comprise: causing a LBT priority class to which a higher QoS priority class is mapped to be not lower than a LBT priority class to which a lower QoS priority class is mapped According to some embodiments of the present disclosure, the mapping relationship can be predefined.

According to some embodiments of the present disclosure, the mapping relationship can be configurable. In these embodiments, there may be a default mapping relationship. In these embodiments, the mapping relationship can be semi-statically configurable.

According to some embodiments of the present disclosure, the mapping relationship can be cell-specific. According to some embodiments of the present disclosure, the mapping relationship can be user equipment-specific.

According to some embodiments of the present disclosure, if each QoS priority class is only mapped to one LBT priority class, the transmitting unit 1020 can be further configured: when the radio traffic is associated with at least two LBT priority classes of the multiple LBT priority classes, transmit radio traffic using a lower LBT priority class of the at least two LBT priority classes.

According to some embodiments of the present disclosure, the communication device 1000 can be a base station, and the determining unit 1010 can be further configured to: configure a mapping relationship between multiple QoS priority classes and multiple Listen-Before-Talk (LBT) priority classes. According to some embodiments of the present disclosure, the transmitting unit 1020 can be further configured to: transmit the mapping relationship to user equipment. Furthermore, the transmitting unit 1020 can be further configured to: transmit the mapping relationship to the user equipment via a broadcast message. Alternatively, the transmitting unit 1020 can be further configured to: transmit the mapping relationship to particular user equipment via a user equipment-specific message.

According to some embodiments of the present disclosure, the communication device 1000 can be a base station and if the mapping relationship is configurable, the communication device 1000 can further comprise: a receiving unit 1030. The receiveing unit can be configured to receive, from a neighboring base station, a mapping relationship used by the neighboring base station; and the determining unit 1020 is further configured to configure the mapping relationship based on mapping relationship used by the neighboring base station.

According to some embodiments of the present disclosure, the communication device 1000 can be user equipment, and the determining unit 1010 can be further configured to: receive the mapping relationship from a base station. In these embodiments, the determining unit 1010 can be further configured to: receive the mapping relationship from a base station via a broadcast message. In these embodiments, the determining unit 1010 can be further configured to: receive the mapping relationship from a base station through a user equipment-specific message.

According to some embodiments of the present disclosure, the QoS priority class can comprise Quality Class Identifier QCI. According to some embodiments of the present disclosure, the QoS priority class can comprise Data Radio Bearer DRB and/or Signaling Radio Bearer SRB.

In the description of the embodiments of the present disclosure, the term "comprise" and other similar expressions indicate an inclusion in an open manner, i.e., "include, but are not limited to". The term "based on" represents "at least partly based on". The term "an embodiment" or "the embodiment" means "at least one embodiment".

It should note that the embodiments of the present disclosure can be implemented by hardware, software or the combination of hardware and software. The hardware part can be implemented by special logic while the software part can be stored in the memory and executed by an appropriate instruction execution system, such as a microprocessor or special-designed hardware. Those skilled in the art can understand the above device and method can be implemented by means of computer executable instructions or within the processor control code, for example, such code is provided for a programmable memory or data carrier such as optical or electronic signal carrier.

Furthermore, although the drawings describe the operation of the method of the disclosure in a specific sequence, it does not necessarily require or suggest that the operation must be executed in the specific sequence or all shown operations must be executed to realize the expected result. On the contrary, the order of the steps depicted in the flow chart can be altered. Additionally or alternatively, some steps can be omitted or multiple steps can be combined into one step for execution, and/or one step is disintegrated into multiple steps for execution. It should also note that the features and functions of two or more apparatuses in the disclosure can be materialized in one apparatus. Conversely, the feature and function of one apparatus described above can be materialized by multiple apparatuses.

Although the disclosure is described with reference to multiple specific embodiments, it should be understood that the present invention is not restricted to the embodiments of the disclosure. The present disclosure aims to encompass all kinds of modifications and equivalent arrangements included within the spirit and scope of the appended claims.

We claim:

1. A method performed by a communication device working on an unlicensed frequency band, comprising:
   determining a mapping relationship between multiple quality of service (QoS) priority classes and multiple Listen-Before-Talk (LBT) priority classes, wherein the multiple QoS priority classes are in one-to-one correspondence with multiple QoS requirements and wherein each QoS priority class is mapped to only one LBT priority class; and
   transmitting radio traffic based on the mapping relationship.

2. The method of claim 1, wherein the mapping relationship comprises:
   causing a LBT priority class to which a higher QoS priority class is mapped to be not lower than a LBT priority class to which a lower QoS priority class is mapped.

3. The method of claim 1, wherein the mapping relationship is cell-specific.

4. The method of claim 1, wherein the mapping relationship is user equipment-specific.

5. The method of claim 1, wherein transmitting radio traffic based on the mapping relationship comprises:
   if the radio traffic is associated with at least two LBT priority classes of the multiple LBT priority classes, transmitting the radio traffic using a lower LBT priority class of the at least two LBT priority classes.

6. The method of claim 1, if the communication device is a base station, determining a mapping relationship between multiple QoS priority classes and multiple LBT priority classes comprises:
   configuring the mapping relationship between the multiple QoS priority classes and the multiple LBT priority classes.

7. The method of claim 6, further comprising:
   transmitting the mapping relationship to user equipment.

8. The method of claim 6, further comprising:
   receiving, from a neighboring base station, a mapping relationship used by the neighboring base station; and
   configuring the mapping relationship based on the mapping relationship used by the neighboring base station.

9. The method of claim 1, if the communication device is user equipment, determining a mapping relationship between multiple QoS priority classes and multiple LBT priority classes comprises:
   receiving the mapping relationship from a base station.

10. The method of claim 1, wherein the QoS priority class comprises Quality Class Identifier (QCI).

11. The method of claim 1, wherein the QoS priority class comprises Data Radio Bearer (DRB) and/or Signaling Radio Bearer (SRB) and/or a physical layer signaling.

12. A communication device working on an unlicensed frequency band, comprising:
   at least one processor;
   at least one memory including computer program code, the at least one memory and the computer program code configured to, with the at least one processor, cause the communication device to at least:
   determine a mapping relationship between multiple quality of service (QoS) priority classes and multiple Listen-Before-Talk (LBT) priority classes, wherein the multiple QoS priority classes are in one-to-one correspondence with multiple QoS requirements and wherein each QoS priority class is mapped to only one LBT priority class; and
transmit radio traffic based on the mapping relationship.

* * * * *